United States Patent
Roemer (10) Patent No.: US 8,963,683 B2
(45) Date of Patent: Feb. 24, 2015

(54) ENABLING OF FUNCTIONS IN A DOOR DRIVE

(75) Inventor: Martin Roemer, Breckerfeld (DE)

(73) Assignee: Dorma GmbH + Co. KG, Ennepetal (DE)

( * ) Notice: Subject to any disclaimer, the term of this patent is extended or adjusted under 35 U.S.C. 154(b) by 1122 days.

(21) Appl. No.: 12/991,258

(22) PCT Filed: May 5, 2009

(86) PCT No.: PCT/EP2009/003209
§ 371 (c)(1),
(2), (4) Date: Nov. 5, 2010

(87) PCT Pub. No.: WO2009/135644
PCT Pub. Date: Nov. 12, 2009

(65) Prior Publication Data
US 2011/0060468 A1    Mar. 10, 2011

(30) Foreign Application Priority Data

May 7, 2008  (DE) .......................... 10 2008 022 714

(51) Int. Cl.
- *B60R 25/00* (2013.01)
- *H04L 9/32* (2006.01)
- *E05F 15/20* (2006.01)
- *G05B 19/042* (2006.01)

(52) U.S. Cl.
CPC ............ *E05F 15/20* (2013.01); *G05B 19/0421* (2013.01); *E05Y 2800/205* (2013.01); *G05B 2219/23412* (2013.01); *E05Y 2900/132* (2013.01)
USPC .......................................... 340/5.7; 713/178

(58) Field of Classification Search
USPC ........... 340/5.7–5.72, 545.1–545.9, 546–549; 70/278, 263; 700/275; 16/49; 713/178
See application file for complete search history.

(56) References Cited

U.S. PATENT DOCUMENTS

| | | | | |
|---|---|---|---|---|
| 5,789,887 A | * | 8/1998 | Elischewski | 318/468 |
| 5,802,670 A | * | 9/1998 | Bienek | 16/53 |
| 6,064,316 A | * | 5/2000 | Glick et al. | 340/5.65 |
| 6,084,376 A | * | 7/2000 | Piedl et al. | 318/605 |
| 7,180,260 B2 | * | 2/2007 | Murphy et al. | 318/466 |
| 8,225,458 B1 | * | 7/2012 | Hoffberg | 16/49 |
| 8,232,754 B2 | * | 7/2012 | Ozaki | 318/400.15 |
| 8,415,902 B2 | * | 4/2013 | Burris et al. | 318/3 |
| 8,547,046 B2 | * | 10/2013 | Burris et al. | 318/466 |

(Continued)

FOREIGN PATENT DOCUMENTS

| | | |
|---|---|---|
| DE | 10 2004 05243 | 5/2006 |
| DE | 10 2006 02976 | 1/2008 |

(Continued)

*Primary Examiner* — Benjamin C Lee
*Assistant Examiner* — Sigmund Tang
(74) *Attorney, Agent, or Firm* — Cozen O'Connor (57) ABSTRACT

A method for operating a door operator, includes inserting a first functional module into a slot of the door operator. The first functional module includes first information data function to be enabled. The first information data is transmitted to the door operator and, determining which additional functions are to be enabled. A first unique first identification is generated in the door operator. This generated first identification is transmitted back to the first functional module and saved in the first functional module. The determined functions to be enabled are activated, respectively enabled in the door operator.

17 Claims, 7 Drawing Sheets

(56) References Cited

U.S. PATENT DOCUMENTS

2003/0112123 A1  6/2003  Hom et al.
2010/0320944 A1* 12/2010 Romer .................... 318/380
2011/0060466 A1* 3/2011 Tandrow et al. ............ 700/275

FOREIGN PATENT DOCUMENTS

| EP | 0 643 189 | 3/1995 |
|---|---|---|
| EP | 0 756 663 | 2/1997 |

* cited by examiner

ENABLING OF FUNCTIONS IN A DOOR DRIVE

PRIORITY CLAIM

This is a U.S. national stage of Application No. PCT/EP2009/003209, filed on May 5, 2009, which claims priority to German Application No: 10 2008 022 714.5, filed: May 7, 2008, the contents of which are incorporated herein by reference.

BACKGROUND OF THE INVENTION

1. Field of the Invention

The invention relates to a method for operating a door operator and a door operator.

2. Related Art

EP 0 756 663 B1 describes a mechanical door operator. A cam plate unit, which partially passes through a spring, is supported in a cylindrical housing of the door operator. On one side, this spring is bearing against a projection in the housing, and, on the other side, against a shoulder of the cam plate unit. Furthermore, the door operator is equipped with a drive shaft to which the door leaf to be moved is connected. The drive shaft presents an eccentrically shaped cam disc within the housing. This cam disc is placed between two rollers, which are disposed at the cam plate unit and act as supports, respectively as a pressure element. On account of the eccentricity of the cam disc, a movement of the drive shaft results in a longitudinal movement of the cam plate unit.

In addition to the described mechanical door operators, furthermore, electro-mechanical door operators are utilized. The mentioned operators have an electro-mechanical system that can be utilized for opening and/or closing a door. Integrated control circuits are being used for controlling the electrical components of the door operator. Thus, it is for example possible to appropriately program the integrated control circuits.

From the state-of-the-art it is known that door operators are able to perform a plurality of functions. Depending on the application, it has proven to be advantageous if one of the following functions can be initiated at the door:

emergency stop function,
"automatically open", or
"push-and-go" function.

By completing a door operator with the above mentioned functions, it is possible to employ said door operator where special applications are required, such as in a hospital. A nurse is thus in the position to activate a "push-and-go" function by touching the door, which results in an automatic opening of the door. However, it has proven not to be necessary to equip each door operator with the entire range of possible functions. On the contrary, a basic module of a known door operator is equipped with functional modules, which allow for performing the respectively desired function. In this case, it has proven to be disadvantageous that the door operators are prone to failure and become more expensive, when utilizing a plurality of fitted functional modules. In addition, restrictions in the number of possible functions that can be realized by the door operator result from the limited number of functional modules that can be fitted on. Moreover, the plurality of functional modules requires to provide a relatively large structural space, which otherwise remains unutilized.

SUMMARY OF THE INVENTION

Based on the above explained state-of-the-art, it is the object of an present invention to provide a method for operating a door operator, which overcomes the above mentioned disadvantages, and allows in particular for operating a door operator in a reliable and inexpensive manner.

A method for operating a door operator, which has at least one activation scenario, is disclosed within the scope of the invention. The activation scenario comprises a step of inserting a first functional module into a slot of the door operator. The first functional module includes first information data on at least one function to be enabled. Thereupon, these first information data is transmitted to the door operator. On the basis of the transmitted first information data, it is determined within the door operator, which additional function(s) is(are) to be enabled. In addition, a unique first (registration) identification is generated in the door operator. This generated first identification is transmitted back to the first functional module and thereupon saved in the first functional module. Thereupon or simultaneously, the detected function(s) to be enabled is(are) activated, respectively enabled in the door operator.

Once the activation scenario is completed, the door operator is thus provided with at least one first additional function.

In an expansion scenario, i.e. when activating additional functions, which are different from the first function(s), namely a function(s) other than the first function(s), within the scope of the inventive method, first of all, the first functional module is removed from the slot and a second functional module is inserted into the slot. The second functional module has information data on a second function/second functions to be enabled by the module. Again, this second information data is transmitted to the door operator. Based on the transmitted second information data, the additional function(s) to be enabled is(are) determined in turn preferably in the basic module. Thereupon, a second identification is generated in the door operator, transmitted to the second functional module and stored within the second functional module. Thereupon, the second functional module is removed from the slot and the first functional module is reinserted. Preferably the second transmitted information data stored in the first functional module and preferably in the door operator, respectively in the basic module. Then the determined second function(s) is(are) enabled in the door operator.

If the door operator should be able to execute at least one other function, consequently this second function is enabled in the framework of the expansion scenario by a second functional module. The first functional module is only temporarily exchanged and replaced by the second functional module. Once the second function is activated, it is no longer necessary to leave the second functional module plugged in the slot. On the contrary, a repeat integration is required again, i.e. inserting the first functional module into the slot, in order to allow the latter to save these information data on the additional function. Consequently, within the scope of the inventive method, the first functional module saves information data on all the functions which are enabled, respectively activated in the door operator, and which can be triggered, respectively utilized for the door operator. The first functional module thus forms a type of "container" module.

Another function of storing the identifications in the respective second functional module preferably is to invalidate the respective second functional module. The second functional module can not be utilized any more for enabling (the same) function(s) in a door operator. For this purpose, directly after inserting a respective functional module into a slot of a door operator, the inventive method includes the step of verifying whether or not an identification has already been stored in the respective functional module. If a stored identification is recognized, enabling the respective function(s) in the respective basic module is prevented. This circumstance may be indicated for example visually or audibly at or in the door operator.

Thus, the core of the inventive method includes utilizing a single slot in which always only one functional module can be inserted.

This method allows for a unique allocation of the enabled function(s) to the basic module, i.e. the first functional module. By storing all identifications on, respectively in the first functional module, there is no more need for a plurality of slots, into which the different functional modules would have to be inserted. Thus a door operator, which is operated according to the inventive method, is less prone to failure and can be produced at lesser expense. In addition, the space advantage is enormous. The other problem of having only a limited number of extension slots, respectively functional modules, is inexistent; practically, the door operator can be equipped with an unlimited number of additional functions.

Within the scope of the invention the term "door operator" comprises all the units which can be utilized for automatically operating an arbitrarily equipped door. Consequently, the door operator serves for the rotational and/or translational movement of the door about an axis, respectively along a displacement path. It is the task of the door operator to assist a user in opening and/or closing the door or to reduce the speed at which a door is moving, or to allow such a movement in the first place.

Consequently, the term "door operator" comprises in particular swing leaf operators, door closers, sliding door operators, revolving door operators, and/or partitioning wall operators.

Preferably, the very first time the slot is occupied in an activation scenario, it is by a functional module. Consequently, the activation scenario can only be triggered once in each basic module. By introducing or inserting a first functional module into the slot, said first functional module is selected by the basic module in that, in the future, it will save identifications of other functions to be activated in the future. In this case, it is of no importance which function(s) are triggered by the first functional module in the basic module itself.

According to one embodiment of the invention, all functional modules essentially have the same basic structure, which, in the event of an expansion scenario, allows for saving more information data on more, namely other functions. Consequently, a user of the inventive method selects a door operator and an arbitrary functional module. By inserting this arbitrary functional module into the slot, the functional module becomes the basic functional module or also the container module for the identification information data. Thus, the basic module and the basic functional module are functionally coupled, respectively connected to each other by other connections yet to be described.

According to one embodiment of the invention, a unique function code is allocated to each function. Thus, a first function code is allocated to a first function and a second function code is allocated to a second function. These function codes are advantageously stored in the respective functional module.

The starting point is that, all the possible functions of the door operator are already implemented in the basic module of the door operator. For activation purposes, only the function code for the function to be activated is stored in the respective functional module. No further information data is required on the very often substantial functions, which thus would require a lot of memory space, therefore the functional modules require only very small memories. Therefore, it is likewise possible to manufacture standardized basic modules and functional modules, which helps reduce manufacturing costs. Another advantage results in the event new functions are added or errors are found in already commercialized functions, and require updating the system. The software, respectively firmware needs to be updated in the basic modules of the door operators, not in the functional modules. This is in particular advantageous because the door operators are always accessible; functional modules may be misplaced or cannot be found temporarily, such that updating would be impossible. In addition it becomes redundant to perform the otherwise required step of updating the updated firmware, which has been installed in the functional modules, likewise in the respective door operator, by inserting the functional modules in question into the door operator and by running a specific updating routine.

During the activation scenario, on account of the function code(s) in the first functional module, the basic module recognizes the first function(s) to be activated. Thus, following this activation scenario, a user can trigger, respectively utilize this first function of a door. In this case, enabling the first function(s) is preferably realized by saving the function code(s) of the first functional module in the basic module. Even if the function itself is already stored in the basic module, by storing the function code in the basic module it is made sure that a unique allocation of the functions of the basic module and of the first functional module is guaranteed in the event of an expansion scenario. From the enabling process on, the first functional module, respectively basic module can only be utilized with this single door operator, thus preventing misuse, for example theft and utilization in another door operator.

In the activation scenario, once the functional module has been inserted, a basic communication takes place preferably between the basic module and the first functional module. During the course of this basic communication, information data are exchanged between the first functional module and the basic module. The exchanged information may be an identification. The identification serves for a unique recognition of the functional modules utilized by the door operator.

In a first variant, the basic module generates an identification and saves it. In an activation scenario, the basic module transfers this identification to the first functional module. However, as an alternative it is also possible that the basic module reads, from the first functional module, a unique identification, which is stored in the first functional module. During manufacturing, the identification is assigned to the basic module and/or to the first functional module. If the identification is assigned to the basic module, later on it can be verified at any time for which basic module the selected functional module has been utilized as the first functional module. If the two units, basic module and first functional module, were to be separated later on, this circumstance would not result in loosing the unique allocation. The alternative embodiment variant allows for an individual identification of each functional module. This circumstance has proven to be advantageous in particular during manufacturing, because it ensures a detailed overview on manufactured and sold functional modules. Thus, preferably the identification is stored in both, the basic module and in the first functional module.

Within the scope of the inventive method, the term "identification" on the one hand comprises unique, in particular encoded information data, which allows for a unique allocation of the functional module to the respective basic module. Furthermore, the term comprises information data required for activating the functions in the basic module.

The starting point for an expansion scenario is, if a user of the door operator wishes to be able to utilize an additional function in this door operator. It is intended for this purpose that the first functional module is removed from the single slot of the basic module. Removing the first functional module, without inserting another functional module after a defined period of time has elapsed, results in de-activating the basic module, respectively the active functions thereof, such that in this case only the basic functions of the door operator are still available. In order to avoid such de-activating, the second functional module is inserted into the slot. By recognizing the second functional module, on the one hand de-activating the basic module is stopped and/or delayed for another period of time. Now, according to the invention, it is intended that the basic module recognizes inserting the second functional module and records the second function(s) stored in the second functional module and activates them in the basic module. This may be performed by way of example in that a computer program, running in the basic module, respectively in the door operator, reads the second function code from the second functional module and enables the second function(s) in the basic module by an appropriate program routine. Thus, upon communication between the basic module and the second functional module, the user is able utilize the second function of the door operator. Preferably, the second function code, respectively a second identification generated in the basic module, is saved in both the basic module and in the second functional module.

Upon activation of the second function(s), the second functional module is removed from the slot and the first functional module is reinserted. Thereupon, the second function code is saved as well in the first functional module as described above. Consequently, both the first and the second function codes are then stored in the first functional module. Thus, the first functional module serves like a data storage for the functions enabled in the basic module.

All function codes, respectively identifications are preferably saved in non-volatile memory elements of the basic module and of the respective functional modules. It is thereby ensured that the functional allocation is available at a door operator in question, for example even after a power failure. Thus, separating the door operator from a power supply does not result in loosing the information data.

In order to guarantee storing and/or processing different function codes and/or identifications, data memories and/or integrated control circuits are included in the basic module and/or the functional modules. In this case, within the scope of the invention, all electronic circuitry based on semi-conductor substrates are designated as integrated control circuits. The integrated control circuits may be for example one of the following: FPGA (Field Programmable Gate Array), Microcontroller, ASIC (Application Specific Integrated Circuit) or a processor.

In an expansion scenario, preferably the following additional step is intended:
  Transmitting a de-activation code to the second functional module, whereupon the de-activation code puts the second functional module into a passive state.

This method step ensures that the second functional module can only be utilized once. Once the second functional module is put into the passive state, another activation of the function(s), which can be activated by the second functional module, is no longer possible in another basic module. Thereby, the second functional module is protected against misuse by a non-authorized person. Within the scope of the inventive method, a functional module is characterized in the passive state in that transmission of function codes does not occur any longer. Resetting the functional module from the passive state into an active state can only be performed by the manufacturer of the functional module. It has shown to improve the method, if the de-activation code is sent from the basic module to the second functional module, once the second function code has been saved. It is thereby ensured that first a complete exchange of the second function code has happened, prior to sending the de-activation code. Thus, operating errors, respectively malfunctions of the second functional module are excluded to the largest extent.

It is probable to experience a defect while utilizing the inventive door operator. Should such a defect scenario occur, it is characterized in that the door operator no longer executes certain functions. Advantageously, the basic module includes the possibility of a self-test in order to display such a defect for example in a visual and/or audible manner. In case of a defect scenario basically the following possibilities are given:
  the basic module is defective and/or
  the first functional module is defective.

If the first functional module is defective, it needs to be exchanged for a working functional module. However, all the identifications for all the functions that are enabled in the door operator, are saved in the first functional module. In order to allow nevertheless for continued utilization of the door operator, all present data can be erased from the basic module via a delivery setting of the door operator. Thereupon, a new first functional module needs to be utilized, in which advantageously all identifications of all functions previously enabled in the door operator are stored. Saving the function codes again on the now working first functional module can be performed for example by a technician by a computer.

If however the basic module is defective, it has proven to be advantageous in an exchange scenario:
  to exchange the basic module for a second basic module,
  to introduce the first functional module in a slot of the second basic module, and
  to have the second basic module take over the identification(s) and/or the function code(s) from the first functional module and thus to enable the identified function(s).

Within the framework of the exchange scenario, all information data are transferred from the first functional module to the basic module. Consequently, the second basic module enables all the functions of the exchanged first basic module. In order to prevent misuse, for example in the event of theft, it may be provided that the basic module can take over the information data from the first functional module as described above only in the event an authorized person activates said take-over, for example by entering a special code. This special code is preferably again unique such that it can be utilized for a single door operator only. As an alternative, a device, such as a PDA (Personal Digital Assistant) is being connected to the door operator via an interface and runs the take-over program.

As described above, when removing the first functional module from the door operator, the functions of the basic module are de-activated, for example after a certain period of time has elapsed. As a consequence, the additional functions enabled in the basic module can no longer be utilized. Thereupon, utilizing the first functional module in this door operator is no longer possible. Preferably, when removing the first functional module and/or when de-activation functions in the door operator, a visual and/or audible alarm is emitted.

For operating the door operator, it has proven to be particularly advantageous, if at least one of the following situations is indicated in a visual or audible manner:
the activation scenario,
the expansion scenario,
the insertion of a functional module,
the removal of a functional module,
the defect scenario and/or
the exchange scenario.

In this case, a visual indication is made preferably by a luminous element, such as an LED and/or an OLED.

An inventive door operator has a basic module, a processor unit and a slot. A plurality of functions of the door operator are controllable, respectively can be executed by the basic module. A functional module can be inserted in a reversible manner into the slot, which is integral with the basic module or coupled to it, such that the functional module allows for activating a function of the door operator. The slot is configured such that a temporary exchange of a first functional module for a second functional module and re-inserting the first functional module into the slot, results in activating, respectively enabling of a second function/further functions in the door operator. In this case, the features and individual details, which have been described already for the method, are also valid in conjunction with the inventive door operator.

The basic module and/or the utilized functional modules preferably have a bus communication port. These bus communication ports serve to couple the basic module (and the currently inserted functional module) to the door operator via a bus. Said bus is preferably configured to connect, respectively to couple the respective door operator to one or more other door operator(s) by communications technology. It is in particular possible to connect a plurality of door operators to a central computer unit, in order to allow for a centralized control. The coupling via a bus reduces the number of cables to be run in and outside the door operator.

Such a communication port is preferably an RS485 port. This connection is particularly resistant against exterior influences and allows for data transfer, which complies with the requirements of a modern door operator.

Further measures improving the invention result from the following description of one preferred embodiment of the invention which is diagrammatically illustrated in the Figures. All features and/or advantages, including the constructional details, spatial dispositions and process steps, which result from the claims, the description or the drawings, may be essential to the invention, both by themselves and in their most various combinations.

DETAILED DESCRIPTION OF THE DRAWINGS

Figure 1:
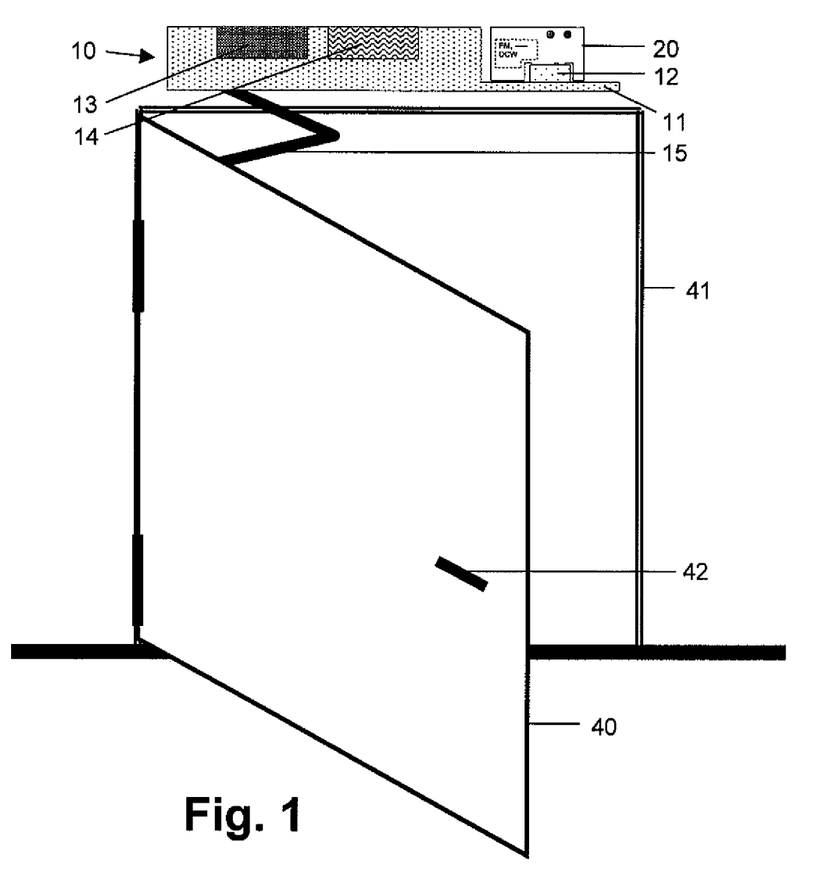
FIG. 1 is a diagrammatical arrangement of a door operator at a door.

A typical arrangement of a door operator 10 according to an embodiment of the invention is illustrated in FIG. 1. The door operator 10 is disposed above a door frame 41 of a door. The door operator 10 has a mechanical or electro-mechanical displacement mechanism, which is operationally connected to the door panel, respectively the door leaf 40 of the door via an arm assembly 15. If desired, the door operator 10 may have a plurality of functions. It is thus for example conceivable that, by contacting a door handle 42 of the door, an opening of the door leaf 40 is triggered, which is assisted by the door operator 10.

In order to allow for correspondingly controlling the different functions, the door operator 10 has a basic module 11. All mechanical and electronic components, which execute the desired functions of the door operator 10, are disposed or accommodated at, respectively in the basic module 11. A communication port 14 and a processor unit 13, which is designed to process a computer program by which the door operator 10 is controlled, are for example incorporated in the illustrated basic module 11. Moreover, the basic module 11 has a slot 12, which in the illustrated example receives a first functional module 20. The first functional module 20 serves to activate and enable functions of the door operator 10. In order to allow for inexpensive manufacturing, the inventive door operator 10 is delivered such that all the functions are already implemented in the door operator 10 in the basic module 11 thereof, however, they are de-activated. Consequently, it is not required to manufacture functionally individually configured door operators 10 for each custom order, instead one standardized door operator 10 can be manufactured.

At least the first functional module 20 is required in order to activate individual functions in the door operator 10. A corresponding activation impulse is triggered by a communication contact between the first functional module 20 and the basic module 11, whereupon an activation routine is started in the basic module, respectively in the processor unit 13. In the following, during normal operation, the functionality of the door operator 10 is expanded by at least one additionally utilizable function.

Figure 2:
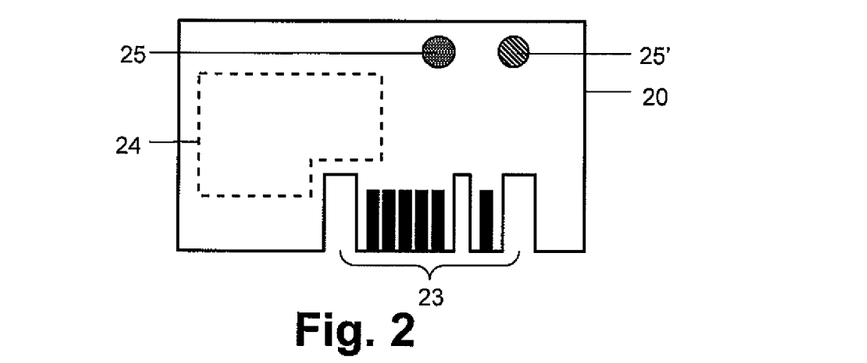
FIG. 2 is a first functional module.

The enlarged first functional module 20 is illustrated in FIG. 2. The first functional module 20 essentially has a storage element (memory) 24 in which information data, respectively function codes 21, yet to be described in detail, are stored.

The inscription "$FM_1$" primarily serves to visually distinguish it from other functional modules. It may however also represent an identification of the functional module 20 saved in the storage element 24.

The storage element 24 may be for example an integrated control circuit, such as an FPGA or a micro-controller, or a preferably non-volatile memory, such as an EEPROM, for example.

For the contact between the above described slot 12 and the first functional module 20, the latter has a contact element 23, which is preferably configured as a connector. In this case, it may be in particular plug contacts, which cooperate with appropriate spring-loaded counter-elements of the slot 12. Preferably, the plug contacts correspond to a connection standard, such as ISA or PCI.

The first functional module 20 preferably has two visual indicators 25, 25' to allow for a user-friendly manipulation. The visual indicators 25, 25' serve to indicate different conditions of the first functional module 20.

The method for enabling functions in the door operator 10 comprises at least one so-called activation scenario in which initially at least one new function is enabled.

Figure 3:
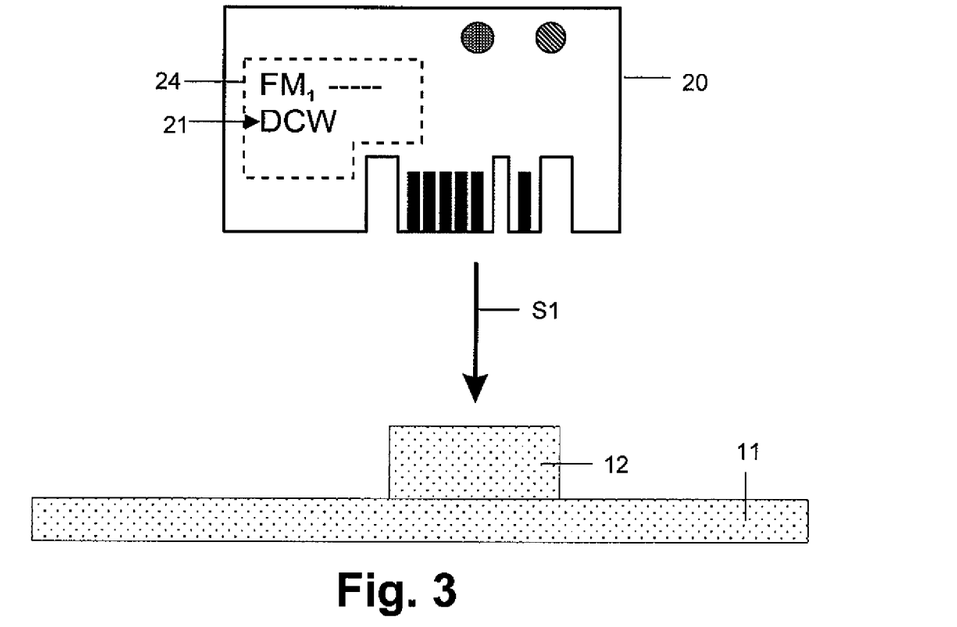
FIG. 3 depicts inserting the first functional module into a basic module.

FIG. 3 shows a first part 1 of the activation scenario. In this case, in a first step S1, the first functional module 20 is introduced, respectively inserted into the slot 12 of the basic module 11. Characterizing information data on the first functional module 20 is stored in the storage element 24. By way of example, information data DCW pertaining to a bus system function are stored in the first functional module 20, illustrated in FIG. 3 and marked $FM_1$. A first function code 21, characterizing this function, is stored in the storage element 24 for this purpose.

Figure 4:
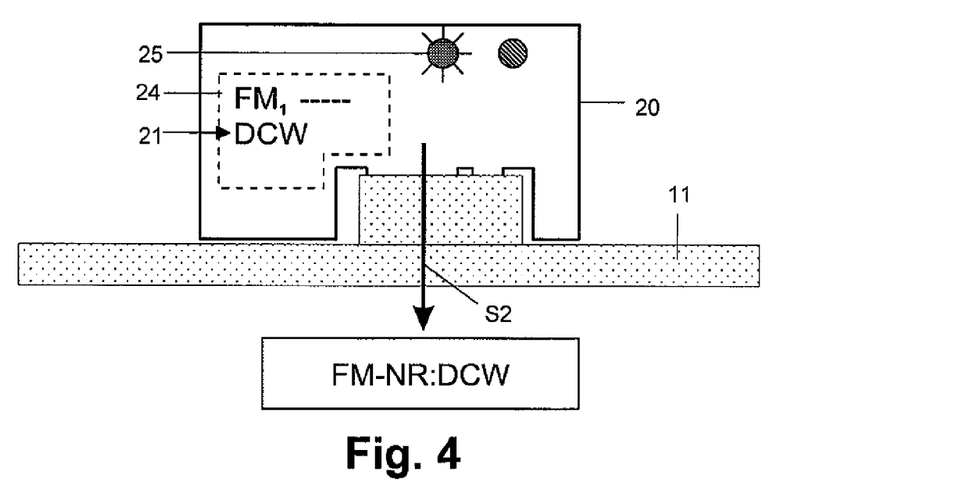
FIG. 4 is the inserted first functional module during communication of the first functional module with the basic module.

Once the first functional module 20 is inserted into the slot 12, this first function code 21, indicated by "FM-NR" in FIG. 4, is transferred, respectively transmitted to the basic module 11 in a step S2. The step S2 is preferably realized in that the basic module 11 recognizes the insertion of the first functional module 20 and thereupon engages in a communication with the first functional module 20, requests the data stored in the storage element 24, and requests the first function code 21 from the first functional module 20 or reads it directly.

Thereupon, based on the transmitted data, the basic module 11 determines which function is to be enabled. In order to indicate the operation state of the first functional module 20 to the outside, the visual indicator 25, which by way of example is embodied as a green LED, is illuminated in the activation scenario. Thus, it is indicated to the user that, at this time, communication is happening between the first functional module 20 and the basic module 11, namely a read-out procedure in the direction of the basic module 11.

Figure 5:
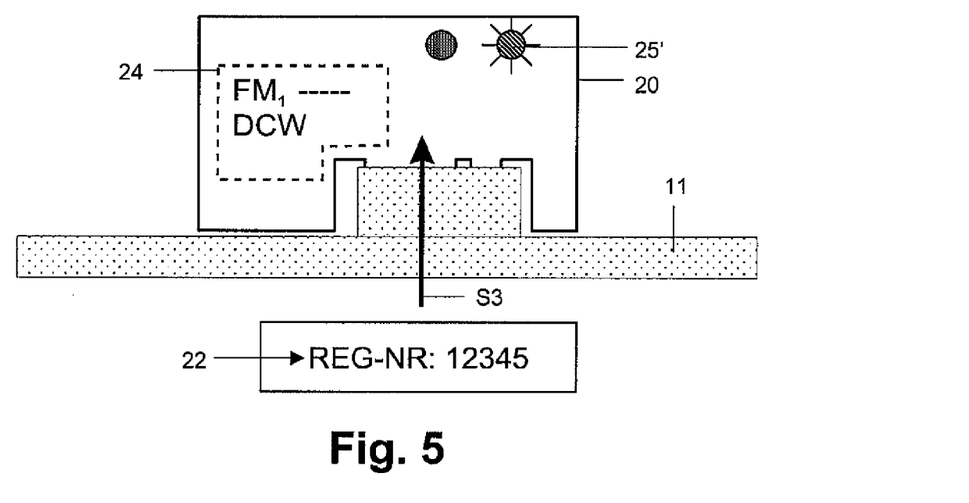
FIG. 5 is the inserted first functional module while transmitting an identification number to the first functional module.

Once the first function code 21 is transmitted, the basic module 11 generates a unique first identification 22, which according to FIG. 5, is identified by "REG-NR" and by way of example has the value "12345". Thereupon, in a step S3, the basic module 11 transmits the generated first identification 22 to the first functional module 20. The first functional module 20 saves the transmitted first identification 22 in the storage element 24, and namely at the memory location identified by "------------", which at this time is not occupied. This procedure may be accompanied, according to FIG. 5, by the now illuminated indicator 25', which by way of example may be embodied as a red LED.

Generating the first identification 22 may be accomplished for example by selecting a table with identifications stored in the door operator 10, in the basic module 11 or in the processor unit 13, or else the basic module 11 calculates the first identification 22 for example based on a unique identification of the door operator 10 and based on the information data transmitted by the first functional module 20.

Saving the first identification 22 in the first functional module 20 may be executed by the basic module 11 by direct writing. As an alternative, the basic module 11 sends a command including the generated first identification 22 to the first functional module 20, which thereupon executes the saving procedure. Preferably, the basic module 11 verifies, for example by reading the storage element 24, if the identification has been correctly stored in the first functional module 20. If everything has been done successfully, the basic module 11 saves the generated first identification 22 additionally in its own memory and then enables the function determined to be enabled.

Figure 6:
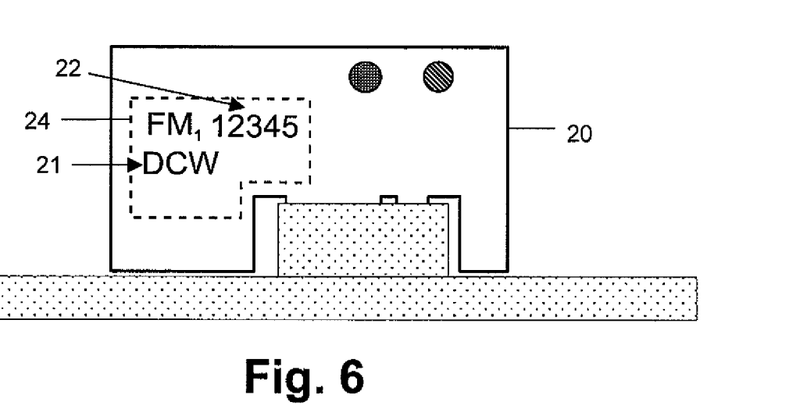
FIG. 6 is the inserted first functional module after having transmitted the identification number.

FIG. 6 shows the condition of the first functional module 20, once saving all the steps described above is completed. As can be seen, the memory location, unoccupied according to FIGS. 3 to 5, now includes the transmitted first identification 22. The storage element 24 includes thus in addition to the first function code 21 preferably also the identification number 22.

Saving the first identification 22 in the first functional module 20 causes an invalidation of the first functional module 20, as will be explained later.

The above described basic communication between the basic module 11 and the first functional module 20 runs during the activation scenario. Principally, it is particular that this activating procedure can only be performed once for each door operator 10. This is linked to the circumstance that the activation scenario can only be executed if not a single identification, identifying an additional function to be enabled, is stored in the basic module 11. Consequently, each functional module, which in the activation scenario is the first to have a communication contact with the basic module 11, assumes the role of the above described first functional module 20.

Generally, only one function code is assigned to each functional module. As a consequence, by inserting a respective functional module into the basic module 11 respectively one additional function can be enabled, or activated in the door operator 10.

If a user of the door operator 10 would like to utilize another function not yet utilizable, this one must be activated as well. This activation is realized in the so-called expansion scenario.

Figure 7:
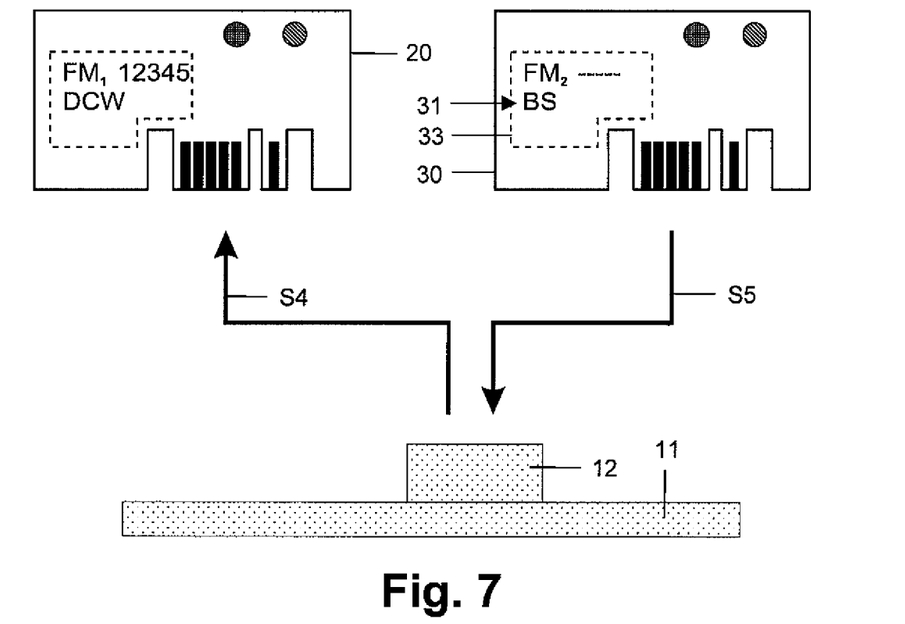
FIG. 7 is an exchange of the first functional module for a second functional module.
Figure 8:
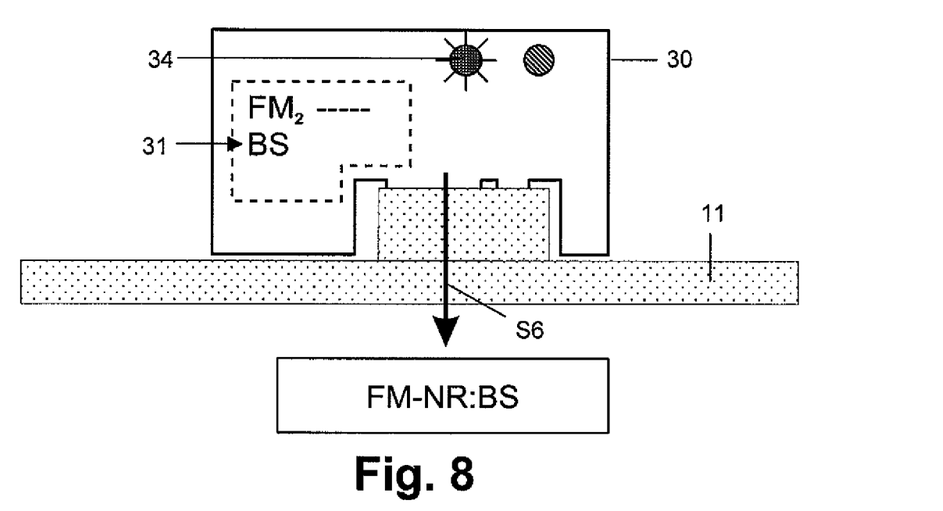
FIG. 8 is the inserted second functional module during communication of the second functional module with the basic module.

As shown in FIG. 7, in the expansion scenario, in a step S4, initially the first functional module 20 located in the slot 12 of the basic module 11 is removed. Thereupon, in a step S5, a second functional module 30 is inserted into the slot 12. The second functional module 30 has information data BS pertaining to a second function in the shape of a second function code 31, thus identifying a second function. The inscription "$FM_2$" on the second functional module 30 serves again primarily to visually distinguish it from the first functional module 20 having the inscription "$FM_1$". As can be seen, the second functional module 30 has again a storage element 33 with a memory location, which, like the first functional module 20, initially does not include an identification, and is again, by way of example, identified by "------------". Once the second functional module 30 is inserted, according to FIG. 8 and analogously to FIG. 4, in a step S6, the function code 31 is transferred from the second functional module 30 to the basic module 11. Here again, the reading procedure of the basic module is accompanied by an illuminated visual indicator 34, which by way of example is again embodied as a green LED.

Figure 9:
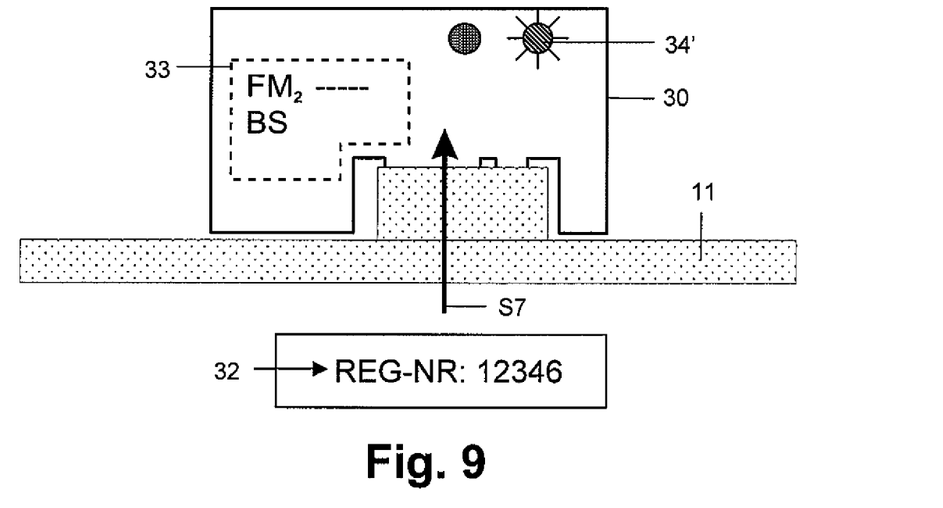
FIG. 9 is the inserted second functional module during invalidation of the second functional module.

Analogously to the description with regard to FIGS. 5 and 6, as illustrated in FIG. 9, a new second unique identification 32 is generated in the basic module 11, according to FIG. 9 by way of example "12346" and, in a step S7, is transmitted to the second functional module 30 and is saved there in the storage element 33, analogously to the first functional module 20. As the second functional module 30 does not assume the function of a container module, in the simplest case, the second identification 32 may be a flag bit, which indicates that this second functional module is no longer available for enabling the exemplary function "BS". Again, this procedure may be accompanied by the now illuminated indicator 34', which by way of example may be likewise embodied as a red LED.

The basic module 11 preferably verifies whether or not saving the second identification 32 was successful. By determining that the saving procedure was successful, the basic module 11 saves the second identification 32 in its own memory.

The second identification 32 thus simply serves to mark the second functional module 30 as no longer being utilizable for enabling the function which is stored therein. The second functional module 30 is in a so-called passive condition. This is why the basic module 11 is able to save, in its memory, the second function code 31 transmitted by the second functional module 30, instead of saving the second identification 32.

Activating the visual indicators 34, 34' of the second functional module 30 is preferably realized in the same way as with the first functional module 20. Once saving the second identification 32 in the second functional module 30 has ended, it can be indicated that the procedure for the second functional module 30 has been completed, for example by turning off both indicators 34, 34'.

Figure 10:
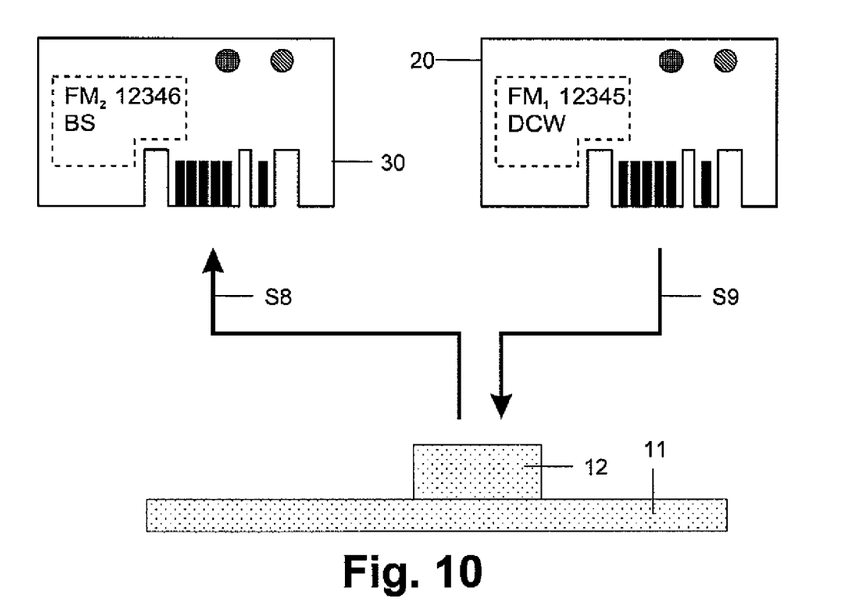
FIG. 10 is an exchange of the second functional module for the first functional module.

Thereupon, as shown in FIG. 10, in a step S8, the second functional module 30 is removed again from the slot 12 of the basic module 11 and, in a subsequent step S9, the first functional module 20 is reinserted into the slot 12.

Thereupon, the basic module 11 preferably checks initially whether or not this is the first functional module 20. If this is not the case, it may be provided to reject the newly inserted functional module.

As an alternative, the newly inserted functional module is considered again to be the second functional module 30 in order to possibly enable another function in the door operator 10. In this case, the following procedure corresponds to the preceding procedure from the time on when the second functional module 30 was inserted in the slot 12, namely from FIG. 8 on. This procedure allows to activate all desired and additional functions that can be enabled in the door operator 10 by second functional modules 30, prior to finally reinserting the first functional module 20. For the user, this represents a simplified procedure and a gain in time, because reinserting the first functional module 20 in between for several times is redundant.

Figure 11:
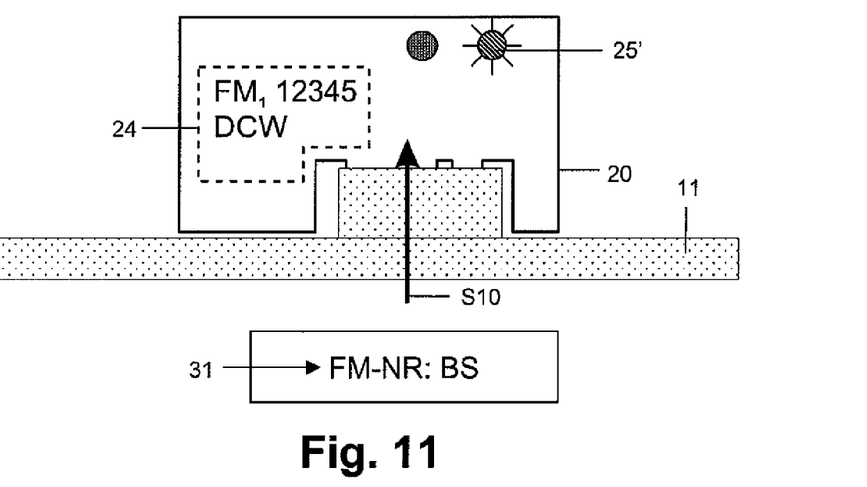
FIG. 11 is the inserted first functional module during communication of the basic module with the first functional module.
Figure 12:
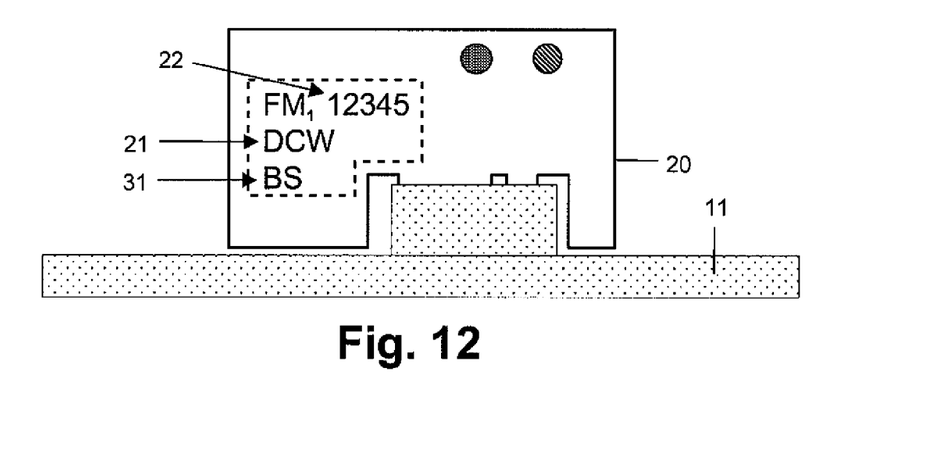
FIG. 12 is the inserted first functional module after terminating the communication.

In the event the newly inserted functional module is the first functional module 20, according to FIG. 11 in a step S10, now the second function code 31 is transmitted from the basic module 11 to the first functional module 20 and is saved, analogously to the first identification 22, in the storage element 24 of the first functional module 20. By way of example this is accompanied by the illuminated visual indicator 25'.

If the basic module 11 has determined that everything worked fine, preferably again following a check of the successful storing of the second identification 32 in the first functional module 20, the basic module 11 now enables the function represented by the second functional module 30.

The above mentioned identifications may be likewise formed by the function codes 21, 31, which are stored in the respective functional module 20, 30.

It is preferably provided that, upon inserting a functional module, the basic module 11 checks whether or not enabling of functions is possible. For this purpose the basic module 11 checks, as described above, whether or not the newly inserted functional module is to be considered as a second functional module 30. If yes, it is checked whether or not an identification is stored in this functional module. If yes, the basic module 11 deals with the functional module such that enabling additional functions is not possible. This may be accompanied for example by a flashing visual indicator 34'. This means, the presence of an identification indicates to the basic module 11 that the functional module has been already used. Thereby a reliable protection against misuse is given.

In order to de-activate again an additional function, preferably an additional de-activation scenario is intended in the above described method. This may be the case, if a door does not require a hold-open function anymore for example. Essentially, the steps to be executed in the de-activation scenario are identical to the ones of the expansion scenario.

But there are the following differences: In a preferred first step, the door operator 10 is switched into a de-activated condition. This may be done for example by a program switch. Thereupon the basic module 11 checks whether or not the function to be de-activated has been enabled by the first functional module 20. This may be realized for example by checking if the first functional module 20 includes function codes without an assigned identification. If this is not the case, this indicates to the basic module 11 that the function to be de-activated was initially enabled by the first functional module 20. In this case, the first identification 22 is erased in the first functional module 20 and in the basic module 11 and the corresponding function is de-activated in the door operator 10.

Otherwise, after having removed the first functional module 20 and inserted a second functional module 30, the basic module 11 checks whether or not the second functional module 30 includes a function code 31 for a function to be de-activated and whether this function code 31 is really stored in the first functional module 20. If this is not the case, the de-activation is not executed and indicated preferably by the flashing visual indicator 34' of the second functional module 30.

Otherwise the basic module 11 checks now whether or not a second identification 32 is stored in the second functional module 30. If not, at this time the second functional module can only be utilized for enabling, however not for de-activating a function. Therefore, also in this case, the de-activation is not executed and indicated, preferably again by the flashing visual indicator 34'.

Otherwise, the step of generating a second identification 32 according to the expansion scenario is skipped. Instead in a step, analogous to step S7, the memory location in the storage element 33 of the second functional module 30 is deleted, in location which the second identification 32 is stored.

Once the second functional module 30 has been removed and the first functional module 20 has been reinserted, the same first function code 32 is deleted in the first functional module 20. At the same time, the basic module 11 de-activates this function in the door operator 10. All that needs to be done now, is to switch the door operator 10 to the normal operating condition.

It is possible that a functional module is adapted to enable several functions. For this purpose, each function to be enabled has its own function code and its own memory location for an identification 22, 32. In the simplest case, a table with two columns is stored in the respective storage element 24, 33, which table has a representation of a respective function code 21, 31 with an assigned identification 22, 32. The basic module 11 determines in this case which function(s) to be enabled is(are) available. A selection of functions to be enabled may be offered to a user, for example via an OLED-display for example at the functional module 20, 30, which functions are then actuated for example via a special button at the door operator 10 or at the functional module 20, 30 itself.

As the above described method for the described scenarios, namely the activation scenario, the expansion scenario, the de-activation scenario, is respectively very similar and kept very simple, relatively little memory space is required in the memory of the basic module 11.

In addition to the above described activation scenario and expansion scenario, preferably the method also includes an exchange scenario. This scenario might occur, if the basic module 11 or even the door operator 10 is defective and therefore needs to be exchanged for a new part. If the basic module 11 is replaced, all initially possible additional functions are de-activated.

However, all first and second functional modules 20, 30, utilized for enabling the additional functions of the defective door operator 10 respectively include identifications 22, 32, such that they can not be utilized for enabling the corresponding functions in the new door operator 10. Therefore, it is intended in the exchange scenario, to bring, respectively to switch the door operator 10 or the basic module 11 to an exchange condition, for example by a program switch. Thereupon, the first functional module 20, originating from the defective door operator 10, is introduced into the slot of the new basic module 11. Thereupon, the basic module 11, determines that the functional module 20, based on the identifications stored therein, is already "assigned". However, on account of the exchange condition, the basic module 11 is prompted to take over all first function codes 21, 31 and identification(s) 22 saved in the first functional module 20, to store them in its own memory and to enable the associated functions in the door operator 10. All that needs to be done now, is to switch the door operator 10 to the normal operating condition.

In conjunction with the above indicated possible period of time, during which a door operator 10 keeps additional functions enabled, without having to insert a functional module 20, 30, the exchange scenario may be also utilized to transfer entire functional configurations from one door operator 10 to another one, without having to prior delete the additional functions in the one door operator 10 and to insert second functional modules 30.

If, as described above, as the second identification 32 a universally valid value, such as a flag, is utilized, the second functional modules 30 can be also universally utilized. A second functional module 30 may be utilized for example in a door operator 10 for enabling a function and thereupon utilized for de-activating the same function in another door operator 10. This means, a customer does not have to know for each door operator 10 which second functional modules 30 have been utilized for enabling purposes, only the function codes 31 need to match.

In the event of a defect in the door operator 10, the method includes furthermore a defect scenario. Initially, with the first functional module 20 being inserted, the latter is removed from the slot 12. Thereupon, a test module is inserted into the slot 12. Preferably, the test module is adapted to recognize its insertion. This may be realized by checking whether or not a supply voltage is applied at a special contact. Thereupon, the test module preferably checks the door operator 10, respectively the basic module 11 thereof.

As an alternative, once the basic module 11 recognizes the test module, it automatically runs a test routine, during which the basic module 11 performs a self test.

If the self-test fails, the basic module 11 is defective. This is preferably indicated by a visual indicator at the test module. Thereupon, the basic module 11, respectively the door operator 10 is exchanged and thereupon needs to be initialized again according to the above described exchange scenario.

If the test is successful, it is very likely that the first functional module 20 is defective. In this case, it is preferably provided to insert a functional module which is set to a specific initialization condition. This initialization condition shows the basic module 11 that it needs to transfer its information data with regard to the enabled functions, namely the function codes 21, 31 and the generated first identification 22 to the newly inserted functional module, which is to be considered as the first functional module. In this case, a time interval monitoring the door operator 10 is to be de-activated by the manufacturer, in order to prevent de-activating the functions in the door operator.

Even though the invention has been described such that the entire method runs in the basic module 11, it is not limited thereto. The processor unit 13 may be provided for example to execute the above described method. In addition, the processor unit 13 may likewise have a memory which serves by way of example as a memory or as a back-up memory for the data which are to be saved in the basic module 11, respectively in the processor unit 13.

As all the functional modules, like described above, are configured identical and adapted to assume the role of both a first functional module 20 and a second functional module 30, standardized functional modules can be manufactured, which helps reduce manufacturing cost.

As a result, the invention provides a universal, simple and reliable method allowing for enabling and disabling (additional) functions in door operators.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for activating and operating a door operator, comprising:
    inserting a first functional module into a slot of the door operator, the first functional module including first information data for at least one function to be enabled;
    transmitting the first information data from the inserted first function module to the door operator;
    determining, in the door operator, the at least one function to be enabled based on the transmitted first information data;
    generating a unique first identification in the door operator from the determined at least one function;
    transmitting the generated first identification to the first functional module;

saving the transmitted first identification in the first functional module to invalidate the first functional module to prevent enabling the determined at least one function in a second door operator;

removing the first functional module from the slot of the door operator; and enabling the determined at least one function saved in the first function module inserted in the slot of the door operator in the door operator.

2. The method according to claim 1, wherein the step of enabling the at least one function is performed if:

the door operator has previously checked whether or not saving the transmitted first identification in the first functional module was successful, and a test result is characterized by successfully saving the transmitted first identification in the first functional module.

3. The method according to claim 2, further comprising:
saving the generated first identification in the door operator.

4. The method according to claim 3, wherein the step of saving the generated first identification in the door operator is effected only if the test result is characterized by a successful saving of the transmitted first identification in the first functional module.

5. The method according to claim 1, further comprising:
removing the first functional module from the slot of the door operator;

inserting a second functional module into the slot of the door operator, the second functional module including second information data for at least one other function to be enabled;

transmitting the second information data to the door operator;

determining in the door operator the at least one other function to be enabled based on the transmitted second information data;

generating a second identification in the door operator;

transmitting the second identification to the second functional module;

saving the transmitted second identification in the second functional module;

removing the second functional module from the slot of the door operator;

reinserting the first functional module into the slot of the door operator;

transmitting the second information data to the first functional module;

saving the transmitted second information data in the first functional module; and enabling the determined at least one other function in the door operator.

6. The method according to claim 5, wherein the step of enabling the at least one other function is performed if:

at least one of:
the door operator has previously checked whether or not saving the transmitted second identification in the second functional module and
the second information data in the first functional module was successful, and the test result is characterized by at least one of:
successfully saving the transmitted second identification in the second functional module and
successfully saving the second information data in the first functional module.

7. The method according to claim 5, further comprising saving the second information data in the door operator.

8. The method according to claim 7, wherein the step of saving the generated second information data in the door operator is performed if the test result is characterized by at least one of:

successfully saving the transmitted second identification in the second functional module and successfully saving the second information data in the first functional module.

9. The method according to claim 1, wherein at least one of:
the first information data comprises a first function code and the second information data comprises a second function code.

10. The method according to claim 9, wherein at least one of:

the first identification is formed by the first function code and the second identification is formed by at least one of the second function code and a flag bit.

11. The method according to claim 10, wherein the transmitted second information data is formed by the second function code.

12. The method according to claim 1, further comprising an exchange scenario, comprising:

removing the first functional module from the slot of the door operator;

exchanging a basic module of the door operator for a second basic module;

inserting the first functional module into the slot of the door operator, and taking over, in the second basic module, at least one of:
the first identification and
the information data pertaining to the at least one function to be enabled, and enabling the at least one function to be enabled in the door operator.

13. The method according to claim 1, wherein directly following the removal of the first functional module from the slot of the door operator, the method further comprises:

checking how long no functional module is inserted in the slot of the door operator; and deactivating all enabled functions in the door operator when a predetermined period of time is exceeded.

14. The method according to claim 1, further comprising a defect scenario, comprising:

removing the inserted first functional module from the slot of the door operator;

inserting a test module into the slot of the door operator; and activating a test routine in one of the door operator and the test module.

15. The method according to claim 1, further comprising indicating predetermined conditions in the functional modules by a visual indicator in the at least one functional module.

16. A door operator comprising:
a basic module, wherein a plurality of functions of the door operator are performed by the basic module;
a processor unit; and
a slot,
wherein the door operator is controlled by at least one of the basic module and the processor unit, and the door operator is configured to:
receive a first functional module into the slot of the door operator, the first functional module including first information data for at least one of the plural functions to be enabled;

transmit the first information data from the first functional module received in the slot to the door operator;

determine in the door operator the at least one of the plural functions to be enabled based on the transmitted first information data;

generate a unique first identification in the door operator based on the at least one of the plural functions;

transmit the generated first identification to the basic module;

save the transmitted first identification in the basic module;

save the transmitted first identification in the first functional module to invalidate the first functional module to prevent enabling the determined at least one function in a second door operator; and enable the determined at least one function in the door operator.

17. A door operator according to claim 16, wherein the basic module has a communication port.

* * * * *